(12) United States Patent
Li

(10) Patent No.: US 11,427,711 B2
(45) Date of Patent: *Aug. 30, 2022

(54) LIQUID SEALANT WITH THERMALLY ADAPTIVE PROPERTIES

(71) Applicant: Board of Supervisors of Louisiana State University and Agricultural and Mechanical College, Baton Rouge, LA (US)

(72) Inventor: Guoqiang Li, Baton Rouge, LA (US)

(73) Assignee: Board of Supervisors of Louisiana State University, Baton Rouge, LA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/859,481

(22) Filed: Apr. 27, 2020

(65) Prior Publication Data

US 2020/0325340 A1 Oct. 15, 2020

Related U.S. Application Data

(63) Continuation of application No. 15/032,491, filed as application No. PCT/US2014/062767 on Oct. 29, 2014, now Pat. No. 10,633,541.

(60) Provisional application No. 61/897,437, filed on Oct. 30, 2013.

(51) Int. Cl.
| | |
|---|---|
| *C08L 101/12* | (2006.01) |
| *C09J 125/08* | (2006.01) |
| *C08F 299/02* | (2006.01) |
| *C08L 75/04* | (2006.01) |

(52) U.S. Cl.
CPC ........ *C08L 101/12* (2013.01); *C08F 299/024* (2013.01); *C09J 125/08* (2013.01); *C08G 2190/00* (2013.01); *C08L 75/04* (2013.01); *C08L 2201/12* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 8,901,253 | B2 * | 12/2014 | Behl | C08G 63/08 |
| | | | | 525/444 |
| 10,633,541 | B2 * | 4/2020 | Li | C08L 101/12 |
| 2009/0309258 | A1 * | 12/2009 | Lendlein | A61L 27/50 |
| | | | | 264/230 |

OTHER PUBLICATIONS

Li (A Shape Memory Polymer Based Self-Healing Sealant for Expansion Joint, Transportation Research Board of the National Academies. Final Report for highway Idea Project 142, pp. 1-6 (2012)).*

* cited by examiner

*Primary Examiner* — Tae H Yoon
(74) *Attorney, Agent, or Firm* — Thomas|Horstemeyer, LLP

(57) ABSTRACT

A composition for sealing defects in structural materials such as roads or paved surfaces, the composition preferably comprising one or more shape memory polymer (SMP) components capable of responding to increased temperature by decreasing in volume.

6 Claims, No Drawings

LIQUID SEALANT WITH THERMALLY ADAPTIVE PROPERTIES

CROSS-REFERENCE TO RELATED APPLICATIONS

This application is a Continuation of U.S. application Ser. No. 15/032,491 filed on Apr. 27, 2016 now U.S. Pat. No. 10,633,541, which is the 35 U.S.C. § 371 national stage of PCT application having serial number PCT/US14/62767, filed on Oct. 29, 2014, which application claims the benefit of and priority to U.S. Provisional Application Ser. No. 61/897,437, filed 30 Oct. 2013, the disclosure of which is incorporated herein by reference in its entirety.

TECHNICAL FIELD

This invention broadly relates to structural materials. More particularly it relates to a shape memory-based liquid smart material for use in repairing or sealing structural defects or cracks (such as in concrete or asphalt pavement). Alternatively, a two-way SMP-based smart material can be constructed into solid expansion panels that are inserted at the time a structure is constructed, in order to accommodate subsequent thermal expansion and contraction yet avoiding the crack development in the structure. A shape memory-based liquid can comprise a liquid binder material along with at least one programmed shape memory polymer (SMP) or at least one two-way shape memory polymer.

BACKGROUND ART

In asphalt pavement and concrete pavement, cracks are inevitable and caused by: reflective cracking, thermal cracking, and fatigue cracking. Cracks allow easy access for water to reach the base, sub-base, or subgrade. Water can deteriorate the substructure and shorten the life of pavement substantially. When cracking has occurred, sealants are typically applied. A goal when applying sealants is to prevent water from seeping through the crack, and to prevent the entry of substances such as salt that might further decay base material and enlarge the crack.

Unfortunately however, current pavement sealants commonly suffer from "adhesion loss." When adhesion loss occurs, one or more surfaces of the sealant pull away from the crack, and consequently a crack reappears. Such separation may occur in colder seasons such as upon freezing or rapid temperature changes, and may also occur in warmer months upon a sudden temperature drop such as from hail storms or rain downpours. This is because of the different thermal expansion properties of the sealant and the concrete/asphalt, and because the strength of sealant, its adhesive strength and/or ductility is not large enough. In addition, during warmer months the structural material which has been repaired undergoes thermal expansion, as does the sealant itself, and this tends to squeeze sealant out of the repaired area.

Similarly, expansion joints are weak links in bridge decks or concrete pavement. Expansion joint failure is a leading cause for structural damage to bridge superstructures or concrete pavement. Due to the critical role played by joints in bridge decks and pavements, crack or joint sealants have been a topic of intensive research for many years.

Various types of sealants have been utilized to seal expansion joints in bridge decks and pavements. The most frequently used types of sealed joints include, but are not limited to, (1) field-poured silicone and polymer modified asphalt joints; (2) compression seal joints; (3) strip seal joints; (4) polymer modified asphalt plug joint system; (5) inflatable neoprene joints; and (6) modular joint sealing system. However, two fundamental problems continue to be challenges in the scientific and industrial community: (1) the gradually loss of interfacial contact, due to plastic deformation of sealant materials, and (2) sealant squeezing out of the channel in summer due to Poisson's ratio effect and thermal expansion.

Thus, there continues to be a need for structural sealants that are resistant to adhesion loss. Moreover, there is also a need for sealants which resist being expelled from repaired defect (or expansion joint) during thermal expansion of the repaired structure. In particular, the need also continues for sealants that are both resistant to adhesion loss, and resistant to being expelled at warmer temperatures.

DISCLOSURE OF THE INVENTION

The present invention relates to a smart material for use to repair, seal or avoid separations, defects or cracks in a structure. The term defect will often be used to refer to these various structural voids or impairments. The defects can be those produced when the structure undergoes thermal expansion and contraction in its ambient environment. Alternatively, a defect can be an expansion joint separation intentionally built into the structure. The repair material comprises a conventional binding material along with at least one SMP (either a programmed one-way SMP or a two-way SMP). When programmed one-way SMP is used, there will be preferably be two or more programmed SMPs, and certain preferred embodiments comprise both a tension-programmed SMP and a compression-programmed SMP.

These smart materials capitalize on SMP properties, accordingly they behave in a manner contrary to conventional (non-SMP) physics. These smart materials may contract in volume when heated, and/or expand in volume when cooled. Smart SMP-based sealants of the invention serve to avoid adhesion failure between a sealant and the repaired structure when the repaired structure is subjected to varied temperatures that cause thermal expansion and contraction. Embodiments of the invention also help avoid expulsion of the sealant from a defect when there is heating and thermal expansion of the thing repaired. Furthermore, embodiments of the present invention can both avoid adhesion failure as well as avoid expulsion from the repaired defect. Also disclosed are methods for making such compositions. In addition, methods are disclosed for customizing such sealing compositions to unique environments or damage contexts. In addition, the use of a two-way shape memory polymer is set forth. Two-way shape memory polymer (due to it having two distinct temperature-related shapes) does not require programming in order to manifest SMP properties of shrinking upon being heated and expanding when cooled.

In certain preferred embodiments the programmed SMP adapts to increased temperature by appreciable volume decrease when the temperature exceeds the glass transition temperature of that SMP, thus behaving contrary to normal thermal expansion. A programmed SMP with these properties is usually obtained by tension programming of a one-way SMP or by use of a two-way SMP.

In certain embodiments, the programmed SMP adapts to increased temperature by appreciable volume increase as the temperature exceeds the glass transition temperature ($T_g$) of a compression-programmed SMP; this expansion is beyond typical thermal expansion pursuant to shape memory properties. A programmed SMP with these properties is usually obtained by compression programming of a one-way SMP.

In certain embodiments, the smart liquid contains two programmed SMP components. For example, a smart liquid can comprise a programmed SMP that adapts to increased temperature by appreciable volume increase when the temperature exceeds the glass transition temperature of this SMP, along with a programmed SMP that adapts to increased temperature by appreciable volume decrease when the temperature exceeds the glass transition temperature of this SMP; a preferred form of this embodiment uses an SMP that responds to increased temperature by decreasing in size (tension-programmed SMP or two-way SMP) usually having a transition temperature in the upper portion of an expected temperature range along with an SMP that responds to increased temperature by inordinate increase in volume (compression-programmed SMP) with a $T_g$ lower than transition temperature of the other SMP. Alternatively, each of the programmed SMPs can be ones which adapt to increased temperature by appreciable volume decrease when the temperature exceeds the respective transition temperature of each SMP. A further alternative, although typically less preferred, embodiment is a sealant in which each programmed SMP adapts to increased temperature by appreciable (beyond thermal expansion) volume increase when the temperature exceeds the respective glass transition temperature of each SMP.

Still another embodiment comprises use of at least one two-way SMP which inherently has two permanent shapes and has the property of shrinking at higher temperature and expanding at lower temperature. Optionally, the at least one two-way SMP can be combined with one or more tension-programmed or compression-programmed one-way SMPs. In addition to use in smart liquid sealants, two-way SMP can be used as a macroscopic solid buffer or sealant. Thus, macroscopically solid two-way SMP can be placed in an expansion joint at the time a surface or structure is constructed.

The American Society for Testing and Materials (ASTM) has several standards that apply to the testing of possible materials for sealants. ASTM 5329 has over a dozen tests for these materials including: Flexibility Testing, Asphalt Compatibility, Artificial Weathering, Bond Testing (Non-Immersed, Fuel Immersed, and Water Immersed), and Tensile Adhesion. In certain embodiments SMP sealants of the invention fulfill one or more of the requirements set by these ASTM standards.

Exemplary embodiments of the invention include: A composition comprising an SMP that decreases volume upon temperature increase, and a binding material, as set forth herein; this SMP can be a tension-programmed one-way SMP or a two-way SMP. A method of making a composition comprising a programmed SMP and a binding material, as set forth herein. A method for defining a customized a composition comprising at least one programmed one-way SMP and a binding material, as set forth herein; preferably two or more programmed one-way SMPs. A method for defining a customized a composition comprising a non-programmed two-way SMP and a binding material, as set forth herein.

Definitions

"Binder" as used herein is used to signify something that produces or promotes cohesion in loosely assembled substances or acts cohesively. For smart liquid sealants of the invention, a suitable binder will be chemically miscible with the SMP component(s). As used herein with programmable SMPs, the binding material is liquid when mixed with the programmed SMP particles (e.g., powder or fibers); the binder-SMP mixture remains liquid prior to being injected into a defect and becomes solid upon subsequent curing. The binder must be liquid at temperatures at and below the $T_g$ of any programmed SMP component of the smart liquid. The binding material is generally conventional; examples of suitable binders available in the art include asphalt emulsions or solvent diluted asphalt or rubber latex such as silicone rubber, acrylic latex, natural rubber, styrene-butadiene rubber, polyurethane, or rubber modified asphalt emulsion.

"Decomposition Temperature ($T_D$)" is defined as a temperature at which chemical bonds are broken or violent oxidation occurs causing a material to catch fire.

"Dual Shape SMP" is an SMP that can have two shapes: a native shape and a programmed shape. One-way SMP are generally also dual shape SMP.

"Glass transition temperature ($T_g$)" describes the temperature at which amorphous polymers undergo a transition from a rubbery, viscous amorphous liquid ($T>T_g$), to a brittle, glassy amorphous solid ($T<T_g$). This liquid-to-glass transition (or glass transition for short) is a reversible transition. The glass transition temperature $T_g$ is always lower than the melting temperature, $T_m$, of the crystalline state of the material, if one exists. Despite the massive change in the physical properties of a material through its glass transition, the transition is not itself a phase transition (a phase transition does occur at the melting point ($T_m$), defined below); rather glass transition is a phenomenon extending over a range of temperatures and is defined by one of several conventions. Several definitions of $T_g$ are endorsed as accepted scientific standards. Nevertheless, all definitions are arbitrary, and they often yield different numeric results: at best, the defined values of $T_g$ for a given substance typically agree within a few Kelvin. Common synonyms for Glass transition temperature ($T_g$) include shape memory transition temperature ($T_{trans}$).

"Melting point ($T_m$)": The term melting point, when applied to polymers, is not used to suggest a solid-liquid phase transition but a transition from a solid crystalline (or semi-crystalline) phase to a still solid amorphous phase. The phenomenon is more properly called the crystalline melting temperature. Among synthetic polymers, crystalline melting is only discussed with regards to thermoplastics, as thermosetting polymers decompose at high temperatures rather than melt. Consequently, thermosets do not melt and thus have no $T_m$. The $T_m$ is what triggers the change between the two native forms of a two-way SMP.

One-way SMP is an SMP with a single glass transition temperature ($T_g$). In the absence of programming one-way SMP has one permanent/native shape. Accordingly, if a one-way SMP is not programmed it retains the same shape immediately above or immediately blow its $T_g$. A one-way SMP has a single native form whether it is compression-programmed or tension-programmed.

"Prestrain" is the maximum strain applied during programming.

"Relaxation time" is the time elapsed during stress relaxation process.

"Shape fixity" is similar to strain fixity, suggesting that a temporary shape is fixed.

"Shape fixity ratio" is the ratio of the strain after programming relative to the prestrain.

"Strain" is defined as the change in length over the original length.

"Strain recovery" is the amount of strain that is recovered during shape recovery process.

"Stress" is defined as the internal load per unit area.

"Stress relaxation" is a phenomenon that, once a material is deformed to a certain extent, the stress continuously reduces while maintaining the strain constant.

"Triple-shape SMP" is an SMP that can have three shapes: a native shape, a shape where a programming "A" takes place, a shape where a programming "B" takes place. A shape where both programming "A" and programming "B" have taken place also may exist but is not counted as one of the shapes. The term "multi-shape SMP" is conceptually similar to triple-shape SMP but generally refers to an SMP that can have more than three shapes.

"Two-way SMP" is an SMP that has two permanent shapes in the absence of any programming. Two-way shape memory polymers change their shape upon stimulation. Many semicrystalline SMPs have demonstrated two-way shape changing effect. During cooling under a constant stress, crystallites form in the loading direction, leading to elongation, accordingly there is expansion as the material is cooled. Additionally, when heated to a temperature above the melting transition of the polymer, the polymer contracts as a result of shape recovery. Thus, a two-way SMP has a larger permanent shape at a "low" temperature and a smaller permanent shape at a "high" temperature; where "low" and "high" are specified in relation to the other. In the present invention a two-way SMP can be used any time a tension-programmed SMP is set forth unless the context clearly indicates otherwise.

"Yield strain" is the strain corresponding to yielding. In the stress-strain curve, the change of slope signals the start of yielding.

MODES FOR CARRYING OUT THE INVENTION

In the following section "SMP" will refer to one-way programmable SMP unless the context indicates otherwise. A programmable one-way shape memory polymer (SMP) can be deformed and by programming become fixed into a temporary shape. It will hold its temporary shape until it is heated to a temperature above its glass transition temperature ($T_g$), whereupon it will recover its original or "native" shape. Compression of an SMP in two or three dimensions is referred to as compression programming. A compression-programmed SMP is smaller in its programmed form (i.e., when below its $T_g$) and revert to its relatively larger native form (i.e., when above its $T_g$). For example, when a powdered SMP is programmed by compression in all three dimensions, the programmed SMP powder will then have the capability to respond to an increase in temperature by expanding back to its original (native or virgin) form. Conversely, by applying tension to an SMP in order to achieve programming (also called pulling programming or tensile programming), the programmed SMP material will have the capability to respond to an increase in temperature by contracting back to its smaller native form. A tension-programmed SMP is larger in its programmed form (i.e., when below its $T_g$) and then reverts to its relatively smaller native form (i.e., when above its $T_g$). After tension-programming the SMP can be milled into, e.g., fibers which will exhibit diminution in size when the fibers reach the SMP glass transition temperature. Programmable one-way SMPs are often referred to as dual shape SMPs. Of note, a one-way SMP has a single native form whether it is tension-programmed or compression-programmed.

Mixing a compression-programmed SMP powder with a conventional liquid binder/sealant creates a "smart" sealant that undergoes additional expansion (which augments normal thermal expansion) which ensures that there is always compressive stress between the sealant and the walls of the defect it is repairing: provided that the compression-programmed SMP remains at a temperature lower than the $T_g$ for the compression-programmed SMP from time of manufacture until shortly before being placed into the defect. For instance, this can be achieved by using the sealant when ambient temperature is colder than the lowest $T_g$ or if the ambient temperature exceeds, $T_g$, it may be applied by refrigerating the smart sealant. In either case, the powder must be stored below its $T_g$ in order to retain its programming. Alternatively, if after manufacture (at a temperature lower than the lowest $T_g$ of any SMP in the composition) the sealant has been packaged by the volume-controlled protocol set forth herein, the sealant can be stored and used in a temperature-independent manner; provided that upon opening the volume-controlled container, the sealant is used before the SMP programming is dissipated.

The binding material is generally conventional and is compatible with the SMP component(s). The binding material will be in liquid form when being mixed with the programmed SMP particles (e.g., powder or fibers); the binder-SMP mixture remains liquid prior to being injected into a defect and becomes solid upon subsequent curing. The binder must be liquid at temperatures at and below the $T_g$ of any SMP component of the smart liquid; being liquid below the $T_g$ this permits mixing of the SMP into the binder and being liquid at the $T_g$ allows the SMP to regain its shape when the material reaches the $T_g$. Examples of suitable binders are available in the art, and include asphalt emulsions or solvent-diluted asphalt or rubber latex such as silicone rubber, acrylic latex, natural rubber, styrene-butadiene rubber, polyurethane, or rubber modified asphalt emulsion.

Embodiments Designed for Unique Environments

With the invention set forth herein, it is to be noted that the smart sealant can be designed to correspond to the particular environmental settings or temperatures that the repaired article will experience. For example, one can first identify the lowest and highest temperatures that will be experienced throughout the year in the structure which is to be sealed/repaired. Alternatively, one can identify a particular temperature range that is of particular concern for the maintenance of structural integrity. After identifying a temperature range of interest, at least two SMPs are selected (or produced in accordance with methodologies known in the art) where one SMP has a $T_g$ at or near one end of the specified temperature range and the other SMP has a $T_g$ at or near the other end of the range. Thus, a smart sealant is prepared that counteracts the thermal expansion and contraction produced by the repaired structure when it experiences the specified temperature range. As noted above, this smart material is designed to be administered while it is at a temperature lower than the $T_g$ of the $T_g$ of every SMP in the composition.

In accordance with the invention one approach for preparing a specialized smart sealant is to employ an SMP with a $T_g$ within the desired temperature range. When this is a programmed one-way SMP, the material will experience shape recovery as its temperature passes through the $T_g$. One component of the smart composition is a compression-programmed SMP that expands when the temperature rises through its $T_g$. A compression-programmed SMP is most useful when it has a $T_g$ in the colder portion of the temperature range. This aspect of the invention provides that the additional expansion following shape recovery from compression programming creates a more complete mating between the sealant and the walls of the thing being repaired. Adhesion failure is avoided above this $T_g$ because the sealant will always have good contact the defect wall.

Preferably, a further component of a smart sealant is another SMP that also has a $T_g$ within the desired temperature range. However, in this case the second SMP will be tension-programmed. A tension-programmed SMP is most useful when it has a $T_g$ in the warmer portion of the temperature range. Preferably the $T_g$ of this SMP is higher than the $T_g$ of the compression-programmed SMP. The tension-programmed SMP will allow the smart sealant to shrink when the repaired thing is warmed to a temperature higher than this $T_g$. Shrinkage of the smart sealant serves to avoid the sealant from being squeezed out of the defect while the adjacent, repaired material is thermally expanding. Alternatively, one may use a two-way SMP instead of a tension-programmed SMP to accomplish shrinkage of the sealant at a higher temperature.

The tension-programmed one-way SMP (i.e., dual shape SMP), is preferably programmed by a level of tension programming that causes the smart sealant to shrink slightly less than the thermal expansion of the repaired structure; if there were more contraction the then expansion of the repaired thing adhesion failure might result between the sealant and the surface of the defect. Similarly, when using a two-way SMP, one selects an SMP that inherently shrinks slightly less than the thermal expansion of the repaired thing to avoid adhesion failure.

Various combinations of SMPs each with a particular $T_g$ together with either compression or tension programming can be utilized in the smart sealant. A two-way SMP can also be used alone or along with any compression- or tension-programmed dual shape SMP. For embodiments of the present invention, a two-way SMP can be used any time a tension-programmed SMP is set forth unless the context clearly indicates otherwise. Accordingly, a smart sealant is generated having unique properties such that it expands inordinately upon heating (above the $T_g$ of a compression-programmed SMP) and/or which contracts upon heating (above the $T_g$ of a tension-programmed SMP, or above the $T_m$ of a two-way SMP). Accordingly, multiple embodiments of the invention exist of which the following are exemplary:
Volume-Controlled Temperature-Independent Smart Sealant Storage In order to effectively use the sealant, yet avoid keeping the sealant below the lowest $T_g$ at all times between manufacture and until just before use, the following packaging protocol can be employed. Following manufacture and while the sealant is still at a temperature below the lowest $T_g$, and while still below this lowest $T_g$, the programmed sealant is then placed into a volume-controlled container. A volume-controlled container is one which does not change appreciably when it is heated, and most importantly does not change appreciably in volume when programmed SMP contained therein is at a temperature above the $T_g$ of a compression-programmed SMP. Without being bound by theory it is believed that increasing the temperature of a sealed volume-controlled container with programmed SMP sealant inside provides further compression force (i.e., programming) to the compression-programmed SMP particles. Therefore, packaging programmed smart sealant in this way, then allowing the volume-controlled contained to rise to a temperature above a $T_g$ for compression-programmed SMP should not dissipate compression programming so as to worsen sealant performance, conversely it may achieve performance improvement. For many applications a major issue for prior art sealants when used to repair small cracks/defects is low temperature debonding. The added compression programming during storage has a positive effect on smart sealant performance at low temperatures. Preferably the volume-controlled packaged sealant is maintained at temperatures lower than the higher $T_g$ (or the $T_g$ of any tension-programmed SMP) in order to avoid dissipating programming of the tension-programmed SMP particles. These tension-programmed SMP will generally be used to address high temperature performance so storage in this manner should still provide great flexibility since it will generally not be the case that storage will be at or above the highest temperature encountered in a particular environment.

EXAMPLES

Example 1

The embodiment of this example uses two (or more) programmed dual-shape SMPs. One SMP is compression-programmed and will generally in particles such as powder or fibers. The other SMP will be tension-programmed and will generally be in fibers. The two dual-shape SMPs will have different shape memory transition temperatures (i.e., $T_g$ or $T_{trans}$). The compression-programmed SMP will have a lower transition temperature; the SMP is designed or selected to have a $T_g$ within or below the low part of annual temperature range to be experienced by the repaired structure. The tension-programmed SMP will have a higher $T_g$ than that of the compression-programmed SMP. The tension-programmed SMP is designed or selected so that its $T_g$ is within the upper part of the annual temperature range experienced by the repaired structure. For example, the compression-programmed SMP will be 3-D compression-programmed and in powder form, and the tension-programmed SMP will be 1-D tension-programmed and in fibers.

This embodiment is designed to be administered at a temperature that is lower than the lowest SMP $T_g$; this can take place by storing and applying the sealant at an ambient temperature lower than the lowest $T_g$ or by refrigerating the sealant when the ambient temperatures are warmer than this lowest $T_g$. Alternatively, the smart sealant may be stored pursuant the volume-controlled temperature-independent storage protocol discussed herein, whereby the sealant can be used at any temperature provided it is applied to a defect before the programming is dissipated once the volume-controlled container is opened.

Without being bound by theory, it is understood that this embodiment works as follows: The product is administered at a temperature lower than the $T_g$ of the SMP with the lowest $T_g$ i.e., the compression-programmed SMP. Then, as the ambient temperature increases, the shape memory of the compression-programmed SMP is triggered, leading to volume expansion. This smart sealant cold months (well beyond the properties of typical thermal expansion), and this expansion facilitates close adherence of the sealant to the defect surface. This is particularly advantageous at relatively low temperatures where the repaired structure has experienced appreciable thermal contraction. This expansion offsets the movements of the repaired thing (e.g., pavement or structure) for all temperatures higher than this $T_g$ causing the sealant to remain in adhesive contact with the structure it is repairing. Furthermore, in the warmer months the tension-programmed SMP is triggered, whereupon the SMP shrinks which causes a decrease in smart sealant volume and counteracts the expansion movement of the repaired structure in warm periods. This tension-programmed SMP helps avoid expulsion of the smart sealant from the defect at warmer temperatures when both the repaired thing (and any prior art sealant) would be thermally expanding.

Accordingly, a sealant is provided that behaves contrary to typical (non-SMP) physics in that it has expands at lower temperatures and contracts at higher temperatures provided that the smart sealant is stored and applied to a defect at temperatures lower than the lowest SMP $T_g$ so that programming forces are not dissipated. Adhesion failure can be minimized or avoided, and that the sealant is not expelled from the defect at warmer temperatures.

Advantageously, temperature-based activity of the smart sealant serves to repeatedly "reprogram" the material. The expansion (at colder temperatures) from compression programming leads to additional tension programming of the fiber SMP and the SMP fiber shrinkage (at warmer temperatures) leads to additional compression programming to the SMP powder. The system works in harmony and only initial programming of each SMP component before manufacturing the smart sealant is needed, and the smart sealant provides service for many thermal cycles.

For example, the powdered SMP can be epoxy-based amorphous SMPs such as polystyrene SMP [1]. The fiber form SMP can be thermoplastic SMP such as polyurethane [2].

Example 2

Embodiments of the invention can comprise use of triple-shape or multi-shape one-way SMPs rather than the dual shape, one-way SMPs used in the previous example. As used here multi-shape SMPs will include triple shape SMPs and all SMPs have more than two programmable shapes unless it is clear the context clearly indicates otherwise. A multi-shape SMP can be block-copolymer (or polymers with single broad glass transitions as set forth in the next embodiment). This embodiment is designed so that it has optimal effect when it is administered to a defect when the smart sealant is at a temperature lower than the lowest $T_g$ amongst all SMPs. Unless this material is stored in accordance with the volume-controlled container protocol herein, this material should be stored at a temperature lower than the lowest $T_g$.

For triple-shape block-copolymers, (consistent with standard nomenclature) the SMP is defined as having three (3) fundamental shapes: First, a native/permanent shape (referred to here as "shape A") in which no programming has occurred. Second, a temporary shape (referred to here as "shape B") corresponding to programming of "block B". The third shape is also a temporary shape (shape C) which corresponds to programming of "block C". The naming of blocks as "B" and "C" is purely for illustrative purposes herein.

For example, blocks B and C have properties as follows: block B has a relatively higher $T_g$, namely a $T_g$ which is within a typical temperature range for the warmest months; block C has a relatively lower $T_g$, namely a $T_g$ which is within or below a typical temperature range for the coldest months.

When programming such a polymer, one begins with tension programming of "block B", at a relatively high temperature. Once the temporary shape is fixed, the tensile-programmed material is machined to particles such as powders or fibers, with the caveat that the machining takes place such that the temperature is always lower than the transition temperature of block B. Then, while maintaining the material at a temperature lower than the $T_g$ of block B, 3-D compression programming of "block C" is performed on the SMP particles. The particulate dual-programmed block-copolymer is then mixed with a conventional liquid binder to form the smart sealant.

For clarity, each programming will be on an already formulated block copolymer (and not individual blocks prior to copolymer synthesis) and the respective programmings have effect on the relevant block in the formed polymer. Nevertheless, because of the different transition temperatures of the two blocks, the programming produces the maximum effect only on a particular block at the particular programming temperature.

Accordingly, when this embodiment of the invention is used it is administered to a defect when the smart sealant is at a temperature lower than the $T_g$ of block C (the compression-programmed block). Thus as the material begins to warm it will trigger the shape memory of block C, leading to volume expansion. As the temperature of the smart sealant then rises to the extent that it is above the $T_g$ of block B, block B is triggered and leads to shrinkage of the sealant, facilitating retention of the smart sealant material within the defect.

Similar to the embodiment with two dual-shape SMPs, the sealant functions contrary to typical (non-SMP) physics—after being administered at a temperature lower than the $T_g$ of block C, as it warms this embodiment expands inordinately (at a relatively cool temperature) and thereby facilitates adhesion between the sealant and the defect; as the temperature increases the material contracts (now at a relatively warmer temperature) avoiding expulsion of the sealant from the defect. These properties facilitate a more complete mating between the surfaces of the polymer and the defect, and facilitate retention of the smart sealant material within the defect.

As with the embodiment of the previous Example, just the initial rounds of SMP programming before manufacturing the smart sealant are required. Each thermal cycle (i.e., a rise in temperature above the respective $T_g$ of block B and $T_g$ of block C) will apply further programming to the other programmed block; thus a temperature rise above the $T_g$ of block B elicits shrinking/contraction of the copolymer material which compresses and further programs compressed block C. Conversely, a temperature rise above the $T_g$ of block C elicits expansion of the copolymer material which further programs tension-programmed block B.

For example, the block-copolymers can be:
(1) poly(ε-caprolactone) (PCL) segments and poly(cyclohexyl methacrylate) (PCHMA) segments [3],
(2) poly(ethylene glycol) monomethyl ether monomethacrylate and poly(ε-caprolactone) dimethacrylate [4],
(3) graft-polymer network from poly(ε-caprolactone)-dimethacrylates (PCLDMA) as macrocrosslinkers and poly (ethylene glycol) monomethyl ether-monomethacrylate (PEGMA) forming the grafted side chains having a dangling end [5], or
(4) poly(ω-pentadecalactone) and Poly(ε-caprolactone) segments as a Versatile triple-Shape Polymer System [6].

For example, referring to document [3], the poly(ε-caprolactone) (PCL) will be "block B" crystallites which contribute to the fixed strain of "shape B" and the polyethylene glycol (PEG) will be "block C" crystallites which contribute to the fixed strain of "shape C" (in this polymer the formation of low-melting temperature PCL crystallites during cooling also contributes to the fixation of shape C).

Example 3

As noted above, the invention comprises use of multi-shape SMPs. The form of multi-shape SMP used in the present Example is one that has a single yet broad glass transition. The broad glass transition allows for discrete programmings at different temperatures within this broad glass transition range. For the purpose of this sealant embodiment, a polymer is selected which has a glass transition range which is broader than or covering a desired portion of the annual temperature range of material to be repaired.

The programming process is analogous to that for block-copolymers, set forth in the previous Example 2. Here, one starts with tension-programming of the SMP at a temperature corresponding to the particular warm annual temperatures, e.g., a temperature above which thermal expansion of the repaired thing would cause expulsion of a prior art sealant from the repaired defect. After that, the tension-programmed SMP is machined to particles such as powder or fibers while keeping the material at a temperature below the tension-programming temperature. After this, the particles are 3-D compression-programmed at a temperature corresponding to cooler yearly temperatures. Once the two-step programming is completed, the dual-programmed SMP is mixed with compatible liquid binder to form the smart sealant of the invention.

As with the embodiment of the previous Example, just the initial rounds of SMP programming before manufacturing the smart sealant are required. Each thermal cycle (i.e., a rise in temperature above the respective programming temperature in the broad $T_g$ will apply further programming to the portion of the SMP programmed in the alternative (compression or tension) manner; thus a temperature rise above the programming temperature used for a tension programming elicits shrinking/contraction of the SMP material which compresses and further programs the portion of the material subject to compression programming. Conversely, a temperature rise above programming temperature in the $T_g$ utilized for compression programming elicits expansion of the SMP which further programs tension-programmed portions of this material.

For example, the SMP with a single broad glass transition can be a polytetrafluor-oethylene backbone and perfluoroether sulphonic acid side chains [7].

Example 4

The liquid smart sealant repair material of this Example has two or more dual-shape SMPs. For this embodiment the SMP is milled short fibers. The two or more dual-shape SMPs will have distinct shape memory transition temperatures (i.e., $T_g$), and each SMP has a $T_g$ within the desired thermal range. In this embodiment, each of the two or more SMPs will be 1-D tension-programmed.

This smart sealant can preferably be at its most compact when it is at a temperature just higher than the highest $T_g$ for any of the two or more SMPs, and the material can be at its most voluminous at a temperature just lower than the lowest $T_g$ for any of the two or more SMPs. It is to be understood that normal thermal expansion and contraction are taking place on this smart sealant as well; thus it is possible, e.g., upon heating the smart sealant for normal thermal expansion to be greater than volume decrease obtained by passing through the $T_g$ of a tension-programmed SMP. It is often preferable that the volume decrease obtained by heating through the $T_g$ of one of the tension-programmed SMP to be greater than normal thermal expansion thereby producing a relative volume decrease for the material as it is heated: this helps avoid the sealant from being expelled from the repaired defect upon heating. Conversely, it is generally preferable that the volume increase obtained by cooling through the $T_g$ of one of the tension-programmed SMPs to be greater than normal thermal contraction, thereby producing a relative volume increase for the material as it is cooled: this facilitates the sealant remaining in adhesive contact with the defect surface as the material is cooled.

Without being bound by theory, it is understood that this embodiment of the invention works in the following way: The product is administered such that the sealant is below the lowest $T_g$ of any SMP. If the material is stored in a volume-controlled container, it may be administered at any ambient temperature with the understanding that upon opening the volume-controlled container, the programmed smart material is applied to a defect before the sealant has time to expand and dissipate its programming. Thus, as the sealant material is heated and passes through a $T_g$ of each tension-programmed SMP, the smart material will undergo sequential contractions. Conversely, as the material is cooled and there is any SMP in the sealant that has a $T_g$ lower than this starting temperature the smart material will undergo tension-programming-related expansion as its temperature falls below any such $T_g$. Here we have a sealant that behaves entirely against normal (non-SMP) physics and expands as it is cooled. This feature allows the material to remain in contact with the adjacent cracked surface through temperature fluctuations, and thereby counteracts the contraction of the structural materials (e.g., pavement) in colder months, and it counteracts the expansion of the structural materials in warmer months; this provides that adhesion failure can be minimized or avoided, and that the sealant not expelled from the defect at warmer temperatures.

Although not to the extent of the embodiment set forth in Example 1 (which had both compression-programmed and tension-programmed SMPs), temperature-based activity of the structure being repaired serves to "reprogram" the SMPs in this smart material. The normal thermal contraction of the repaired structure at colder temperatures leads to additional tension programming of the SMP in this embodiment. Therefore, with only initial programming of each SMP component before manufacturing, the smart sealant of the invention provides service for many thermal cycles.

For example, the fiber form SMP can be thermoplastic SMP such as polyurethane [2].

Example 5

The embodiment of this Example comprises use of multi-shape SMPs. The triple- or multi-shape SMPs can be block-copolymers (alternatively, polymers with single broad glass transitions as set forth in the next embodiment). For block-copolymers, consistent with standard nomenclature, the SMP is defined as having 3 fundamental shapes: First, a native/permanent shape (shape A) in which no programming has occurred. Second, a temporary shape (shape B) corresponding to programming of "block B". The third shape is also a temporary shape (shape C) which corresponds to programming of "block C". The naming of blocks as "B" and "C" is purely for illustrative purposes herein.

This embodiment is designed so that the sealant can be administered at any ambient temperature. Accordingly, in the present embodiment blocks B and C can have properties as follows: block B has a relatively higher transition temperature ($T_g$), generally a $T_g$ which is within a typical temperature range for the warmest months; block C has a relatively lower glass transition temperature ($T_g$), a $T_g$ which is within a typical temperature range for the coldest months of the year. In this embodiment all blocks are tension-programmed. The multiple programmings are accomplished by methodologies known to those of ordinary skill in the art. Once the temporary shape is fixed for each of the blocks, the tensile programmed material is machined to particles such as fibers, with the caveat that the machining takes place so that the temperature is always lower than the lowest $T_g$ of any block. The now fibrous dual-programmed or multiply-programmed block-copolymer is then mixed with a conventional liquid binder to form the smart sealant.

As a point of explanation, this programming is on the entire block copolymer (and not individual blocks prior to copolymer synthesis). Each block in the copolymer is tension-programmed as the temperature falls from above to below the $T_g$ of that particular block, and this single programming has effect on each relevant block in the entire polymer.

Without being bound by theory, it is understood that this embodiment of the invention works in the following way: The product is administered such that the sealant is below the lowest $T_g$ of any SMP block. If the material is stored in a volume-controlled container, it may be administered at any ambient temperature with the understanding that upon opening the volume-controlled container, the programmed smart material is applied to a defect before the sealant has time to expand and dissipate its programming. Thereafter, as the material is heated, and any programmed SMP block in the copolymer has a $T_g$ higher than this starting temperature the smart material will undergo contraction as it is heated through any such $T_g$. Conversely, as the material is cooled and there is any SMP block in the copolymer that has a $T_g$ lower than this starting temperature the smart material will undergo some expansion as its temperature falls below such $T_g$. The behavior of the smart sealant counteracts the typical thermal contraction or expansion taking place in the material/structure that is being repaired when the repaired structure undergoes changes in temperature.

Accordingly, here we have a sealant that behaves entirely against normal (non-SMP) physics and it expands as it is cooled. This feature allows the material to remain in contact with the adjacent cracked surface throughout temperature fluctuations, and thereby counteracts the contraction of the structural materials (e.g., pavement) in colder months, and it counteracts the expansion of the structural materials in warmer months. Accordingly, adhesion failure is minimized or avoided, and the sealant not expelled from a defect at warmer temperatures, and voids between the smart sealant and the repaired surface is minimized or avoided during colder temperatures.

Although not to the extent of the embodiment set forth in Example 2 (which had both compression-programmed and tension-programmed SMP blocks), just the SMP programmings, before manufacturing the smart sealant is required. Temperature-based expansion/contraction activity of the structure being repaired serves to "reprogram" the block copolymer SMP in the smart material. For example, the normal thermal contraction of the repaired structure at colder temperatures leads to additional tension programming of the fiber SMP in the smart sealant. Therefore, only initial one-time programming of each SMP component(s) before manufacturing smart sealant is needed, and the smart SMP-binder sealant of the invention provides service for many thermal cycles.

For example, the block-copolymers can be poly(ε-caprolactone) (PCL) segments and poly(cyclohexyl methacrylate) (PCHMA) segments [3], poly(ethylene glycol) monomethyl ether monomethacrylate and poly(ε-caprolactone) dimethacrylate [4], graft-polymer network from poly(ε-caprolactone)-dimethacrylates (PCLDMA) as macrocrosslinkers and poly(ethylene glycol) monomethyl ether-monomethacrylate (PEGMA) forming the grafted side chains having a dangling end [5], and Poly(ω-pentadecalactone) and Poly(ε-caprolactone) Segments as a Versatile triple-Shape Polymer System [6]. For example, for reference [3], the poly(ε-caprolactone) (PCL) will be "block B" crystallites which contribute to the fixed strain of "shape B" and the polyethylene glycol (PEG) will be "block "C" crystallites which contribute to the fixed strain of "shape C" (in this polymer the formation of low-melting temperature PCL crystallites during cooling also contributes to the fixation of shape C).

Example 6

As with the embodiment discussed in Example 3, this embodiment utilizes an SMP that has a single yet broad glass transition, and this allows one to program the polymer at different temperatures within this broad glass transition range. For the purpose of this smart sealant embodiment, a polymer is selected which comprises a glass transition range which is broader than (or covers a key portion of) the annual yearly temperature range experienced by the material sought to be repaired.

The programming process is analogous to that for block-copolymers set forth above where all programming is tension programming. This SMP is programmed in accordance with methodologies known to those of ordinary skill in the art. For example, one can program the SMP by applying tension while at a temperature higher than the upper end of the $T_g$ range, then while tension continues to be applied, one cools the material until it is cooler than the low end of the $T_g$ range. As the cooling occurs, this serves to sequentially program the SMP at different temperatures within the $T_g$ range. Once the temporary shape is fixed, this material now with multiple tension-programmings, is machined to particles such as fibers, with the caveat that the machining takes place such that the temperature is always lower than the low end of the $T_g$ range for this SMP. The fibrous multiply tension-programmed polymer is then mixed with a conventional compatible liquid binder to form the smart sealant. Preferably, this material will behave entirely contrary to normal (non-SMP) physics such that the material will expand as it cools and contract as it is heated.

For example, the SMP with a single broad glass transition can be a polytetrafluor-oethylene backbone and perfluoroether sulphonic acid side chains [7].

Example 7

Structural Sealant with a Single Dual Mode Programmed SMP

The following exemplary steps are followed in accordance with the present Example:
1. Convert solid SMP to powder form
2. Compression program the powdered SMP
3. Mix programmed SMP powder with liquid binding material 4. Pour SMP-liquid binding material mixture(s) into asphalt structures which contain a predefined defect (crack)

5. Allow specimens to cure several hours, to permit water removal/evaporation from the asphalt emulsion 6. Put specimens through multiple cycles of defined heating (above $T_g$ of the SMP), room temperature stabilization, then cooling and freezing (below $T_g$ of the SMP)

7. Visually inspect specimens for integrity of the sealant itself, and any separation between the sealant and the repaired material.

Materials:

Containers for the asphalt specimens consist of 6 inch inner diameter steel pipe with male threads on one end. Each pipe is 2" long. The pipe is then screwed into a female receiving piece which is firmly affixed to a 7"×7" steel plate. The threads of the pipe and those of the corresponding receiving piece are such that they allow the pipe to be screwed onto the plate so that the end of the pipe is in direct contact with the flat plate, creating a generally liquid tight seal.

Conventional paving asphalt specimens are obtained which are tubular in configuration, with a circular cross-section having a diameter of approximately 6" and a length of approximately 2". Each asphalt specimen is composed of two essentially identical halves. Thus, when the two parts are configured together; such specimen is essentially circular in cross section, and each of the two parts being just under one-half the cross section, i.e. a semi-circle. They are just less than one-half of the diameter of the pipe in order that a "defect" exists between the two halves. When the halves of each asphalt specimen are configured together within the pipe container per this protocol, a "defect" is established between the two abutting flat surfaces. The "defect" runs across the center diameter of the cross section and extends the length of the specimen.

The two halves of each asphalt specimen are inserted into the pipe which has now been affixed to the steel plate. When so assembled, the "defect" between the halves is approximately 0.02" wide when the curved sides of each half are firmly against the inner surface of the pipe. Preferably, the gap is maintained by spacers that run the length of the specimen, the spacers also ensure that the outer curved surface of each of the two-part asphalt specimens is in full, firm contact with the inner surface of the pipe. For example, the spacers can be pieces of steel wire that are 0.02" in diameter.

A styrene based SMP is made, in accordance with procedures known in the art, from vinylbenzene ReagentPlus ≥99% (Sigma-Aldrich, St. Louis, Mo.), vinyl neodecanoate (Sigma-Aldrich, St. Louis, Mo.), and divinyl-benzene, technical grade, 80% (Sigma-Aldrich, St. Louis, Mo.) with Luperox® A98, benzoyl peroxide, reagent grade, ≥98% (Sigma-Aldrich, St. Louis, Mo.) as the radical initiator. The $T_g$ of the styrene-based SMP is 60° C.

A Ball Mill PQ-N2 4×500 mL Gear-Drive Planetary (Across International, New Jersey, USA) was used to fabricate the SMP particles. The power of the machine is 750 W. The powders are taken out from the jar after 12 hours of milling. It is noted that ball milling applied 3-D compressive stress to the powder. Therefore, no additional 3-D compression programming was conducted on the powders.

Then, to create sealants in accordance with the invention, programmed SMP is mixed with standard liquid asphalt binder/sealant. One example of a binder is Speed-Fill™, product code 6438-9-34 (Black Jack Asphalt Seal Inc., Saginaw, Mich., USA); it can provide repair on cracks and joints up to ¾" wide. This Speed-Fill™ crack filler is an example of a conventional fast drying product to be used in accordance with the invention, e.g., one which is suitable for use in the repair of structural materials such as concrete, asphalt roads, driveways, pavements, expansion joints and walkways.

To create the sealant for "specimen A", enough programmed SMP is mixed with standard liquid asphalt binder/sealant to create a mixture with 5% SMP.

To create the sealant for a "specimen B," the above materials are used with the difference that enough programmed SMP is mixed with the standard liquid asphalt binder/sealant to create a 10% SMP mixture.

To create the sealant for "specimen C" no SMP as added to the standard liquid asphalt binder/sealant, it is simply standard liquid asphalt sealant and it serves as a control.

Methods:

Accordingly steel pipes are affixed to the steel plates as set forth above, then the two-part asphalt specimens are inserted into the pipes, and then gaps are maintained by inserting spacers, the respective sealants (A, B, C) are added. To create specimens A, B, and C, the respective sealants were slowly poured into the respective defect such that the defect is fully occupied with sealant.

Each defined heating and cooling cycle consists of three phases: heated, room temperature, and frozen. Heating of the specimens occurs such as in an oven to a temperature above the $T_g$ (60° C.) of the SMP component. Once a temperature above $T_g$ is achieved, it is maintained for 60 minutes. The next phase of the temperature cycle involves removing the specimen from the oven, and then allowing it to achieve room temperature; once room temperature is achieved the specimen is maintained at room temperature for 60 minutes. The next phase of the temperature cycle involves placing the now room temperature sample into a freezer until the specimen is below freezing (0° C.), and maintaining the specimen at this sub 0° C. temperature for 60 minutes.

After each cycle the specimens are inspected for any loss of adhesion. The respective specimens are then each subjected to the specified heating-stabilizing-freezing cycles until any loss of adhesion is noted in any sample.

Specimen C is the first to show loss of adhesion between the walls of the defect and this control sealant. Advantageously, at this same extent of testing, neither specimen A (5% SMP) nor specimen B (10% SMP) show signs of any loss of adhesion between the walls of the defect and the respective sealant.

Upon visual inspection of the three specimens after these temperature cycles, the sealant (a, b, c) within in each of the specimens remains intact.

Example 8

Two-Way SMP-Based Smart Sealant

The present embodiment utilizes the same concept, addressed in more detail herein, that a key advantage for a smart sealant is that it can behave opposite to usual non-SMP physics, i.e., the desired material is able to expand when cooled and contract when heated. Accordingly, set forth is an alternative shape memory polymer-based smart sealant, which comprises a two-way shape memory polymer.

As compared to one-way shape memory polymer, which needs programming to form the temporary shape, two-way shape memory polymer has two permanent shapes and does not need programming to achieve more than one shape. Two-way shape memory polymers change between their permanent shapes upon stimulation. Many semicrystalline SMPs have two-way shape changing effect. During cooling, with the proviso that there is at least some constant stress, crystallites form in the loading direction; this leads to elongation and expansion of the material as it is cooled. Additionally, when heated to a temperature above the melting transition of the polymer, the polymer undergoes shape recovery, contracts and thereby reverts to the other permanent form.

Therefore, when such two-way SMPs are used as a component of a structural sealant, the sealant composition lengthens when cooled and shortens when heated; this is exactly the type of behavior desired for sealant in order to counteract the thermal expansion and contraction of the item being repaired. For comparison, this is conceptually analogous to the shape behavior obtained in tension-programmed one-way SMPs which also become smaller upon being heated.

For instance, we set forth a two-way SMP panel than can be inserted in a joint channel during construction of the surface material (e.g., asphalt, concrete, metal, composite or polymeric structural materials). The panel also comprises a ductile adhesive to bond with the adjacent structure. During service, when the expansion panel reaches the high temperature that elicits one permanent shape, the SCP-based expansion panel shrinks and thereby avoids having the panel either squeeze out of the channel or crush the surrounding structure. Additionally, when the temperature drops, the structure, through the ductile adhesive applies the small tensile load needed to allow the 2-way SMP sealant to increase in size when cooled and thus take the form of its other permanent shape. Accordingly, once the structure reaches the low temperature that elicits the other permanent shape, the panel expands and avoids loss of contact with the structure wall.

2) In addition, we set forth a two-way SMP that is machined into particles (e.g., powders or fibers) and mixed with a liquid binder (e.g., asphalt emulsion or solvent diluted asphalt), to form a smart liquid sealant. This embodiment is useful in sealing cracks in a structure that form after construction, such as thermal cracks, fatigue cracks, reflective cracks, block cracks, alligator cracks, etc.

Example 9

The performance characteristics of a desired sealant can be identified when a person knows or hypothesizes the following: the dimensions of the crack/defect (width, depth), the length of the neighboring concrete slabs, the coefficient of thermal expansion of the concrete, the lowest temperature expected to be encountered, the highest temperature expected to be encountered, as well as the temperature at which the sealant is to be installed. The temperature parameters are of particular importance.

The performance of the sealant depends on several factors, such as the volume fraction of the SMP particles, the prestrain level during programming, the coefficient of thermal expansion of the SMP and the asphalt matrix, the interfacial bonding strength, etc. In accordance with methodologies known to those of ordinary skill in the art, these design parameters can be adjusted depending on the requirements of the defect to be sealed.

For the discussion immediately below, subscripts designate as follows in Table 1:

TABLE 1

| Subscript letter (lower case) | Reference |
|---|---|
| (c) | Concrete |
| (d) | Defect |
| (h) | High |
| (i) | Installation |
| (l) | Low |
| (s) | Sealant |

Therefore, in order to prepare a sealant for use in a particular environment we know or specify each of the following parameters:
the length of the concrete slabs $L_c$,
the defect width $W_d$,
the defect depth $D_d$,
the temperature of the sealant when it is installed $T_i$,
the lowest temperature to be encountered in the environment $T_l$,
the highest temperature to be encountered in the environment $T_h$,
the coefficient of thermal expansion of the SMP sealant $\alpha_s$, and
the coefficient of thermal expansion of the concrete $\alpha_c$.

With these specifications (and working on the assumptions that the temperature is uniform throughout the filled defect and the concrete, and the objects are free to move) we can estimate the shrinkage (S) of the concrete slabs ($S_c$) and asphalt sealant ($S_s$) during winter in the horizontal direction according to the following formulae in Table 2:

TABLE 2

| Material | Shrinkage Formula |
|---|---|
| Concrete | $S_c = L_c(T_l - T_i)\alpha_c$ |
| Sealant | $S_s = W_d(T_l - T_i)\alpha_s$ |

In order to compensate for the combination of these shrinkages, the sealant should expand at least the same amount. Therefore, the recovery strain ($\varepsilon_{winter}$) of the sealant in the winter (which is e.g., controlled by the compression-programmed SMP with lower $T_g$) is:

$$\varepsilon_{winter} = \frac{(S_c + S_s)}{W} \times 100\%$$

Analogously, we can also estimate the vertical recovery strain that is needed to take care of the squeezing out problem in the summer. Assuming the Poisson's ratio of the sealant is "v", the displacement movement (d) of the sealant in the vertical direction due to the combined expansions of the concrete pavement and thermal expansion of the sealant is:

$$d = L_c(T_h - T_i)\alpha_c v + 0.5 D_d(T_h - T_i)\alpha_s$$

The vertical recovery strain required in the summer is:

$$\varepsilon_{summer} = \frac{d}{0.5 D_d} \times 100\%$$

For example, we may plan to seal concrete pavement cracks in an environment such as found in Baton Rouge, La. To do so, the following parameters are specified: $L_c$=6 m, $W_d$=1 cm, $D_d$=10 cm, $T_i$=0° C., $T_l$=−5° C., $T_h$=40° C., $\alpha_s=3.2\times10^{-4}/°$ C., $\alpha_c=1.4\times10^{-5}/°$ C. With these parameters, the calculations provide the recovery strain ($\varepsilon_{winter}$) of the sealant in the winter should be $\varepsilon_{winter}=4.36\%$. Accordingly, our smart sealant should have a recovery strain of 4.36%, so that the sealant will maintain contact with the concrete wall without debonding during the winter. For isotropic materials, volume change is 3-times the linear dimension change, which yields a volume change increase of 13.1% for winter.

Furthermore, the desired recovery strain for the sealant during summer months ($\varepsilon_{summer}$) is calculated. The desired vertical recovery strain is calculated based on the same parameters used in the winter-related calculations, and the assumption that the Poisson's ratio of the sealant is 0.4. Accordingly, the vertical recovery strain is to be: $\varepsilon_{summer}=3.968\%$; this is controlled e.g. by the tension-programmed SMP with the higher $T_g$. For isotropic materials, volume change is 3-times the linear dimension change, which yields a volume decrease is $3\times3.968\%=11.9\%$ for summer.

CITATIONS USED IN EXAMPLES

[1] G. Li and T. Xu. Thermomechanical characterization of shape memory polymer based self-healing syntactic foam sealant for expansion joint. ASCE *Journal of Transportation Engineering*, Vol. 137, No. 11, pp. 805-814, (November, 2011).

[2] G. Li, H. Meng, and J. Hu. Healable Thermoset Polymer Composite Embedded with Stimuli-responsive Fibers. *Journal of the Royal Society Interface*, Vol. 9, No. 77, pp. 3279-3287, (December, 2012).

[3] Bellin I, Kelch S, Langer R, Lendlein A. Polymeric triple-shape materials. Proceedings of the National Academy of Science of USA 2006; 103:18043-18047.

[4] Bellin I, Kelch S, and Lendlein A. Dual-shape properties of triple-shape polymer networks with crystallizable network segments and grafted side chains. Journal of Materials Chemistry 2007; 17: 2885-2891.

[5] Behl M, Bellin I, Kelch S, Wagermaier W, Lendlein A. One-Step Process for Creating Triple-Shape Capability of AB Polymer Networks. Advanced Functional Materials 2009; 19:102-108.

[6] Zotzmann J, Behl M, Feng Y, and Lendlein A. Copolymer Networks Based on Poly(ω-pentadecalactone) and Poly(ε-caprolactone) Segments as a Versatile Triple-Shape Polymer System. Advanced Functional Materials 2010; 20, 3583-3594.

[7] Xie T. Tunable polymer multi-shape memory effect. Nature 2010; 464:267-270.

The complete disclosures of all references cited in this application are hereby incorporated by reference, as is the complete disclosure of priority application Ser. No. 61/897,437. In the event of an otherwise irreconcilable conflict, however, the present specification shall control.

What is claimed:

1. A composition for use in sealing a defect in a structure, comprising:
   a tension-programmed SMP having a $T_g$ and a binding material, wherein said tension-programmed SMP is capable of temperature-dependent alterations in shape without undergoing a phase change;
   wherein said tension-programmed SMP is capable of decreasing in volume as the temperature increases above said tension-programmed SMP's glass transition temperature; and
   wherein the binding material is a liquid at temperatures at and below the Tg of any programmed SMP in the composition.

2. The composition of claim 1, further comprising:
   a compression-programmed SMP having a $T_g$ lower than the $T_g$ of the tension-programmed SMP.

3. The composition of claim 1, comprising:
   at least two non-identical tension-programmed SMPs each having a different $T_g$.

4. The composition of claim 1, wherein the $T_g$ of the tension-programmed SMP is higher than the $T_g$ of the compression-programmed SMP.

5. A method of storing composition for use in sealing structural defects, comprising:
   placing the composition into a volume-controlled container while the composition is at a temperature below a lowest $T_g$ of any SMP in the composition;
   wherein the composition comprises a at least one tension-programmed SMP having a $T_g$ and a binding material, wherein said SMP is capable of temperature-dependent alterations in shape without undergoing a phase change; and
   maintaining a storage temperature below a lowest $T_g$ of any SMP in the composition.

6. The method of claim 5, wherein the volume-controlled container maintains its volume when heated, and maintains its volume when a programmed SMP contained therein is at a temperature above the $T_g$ of the compression-programmed SMP.

* * * * *